(12) United States Patent
Eckelt et al.

(10) Patent No.: US 8,733,228 B2
(45) Date of Patent: May 27, 2014

(54) PNEUMATIC CYLINDER

(75) Inventors: Gunter Eckelt, Wunstorf (DE); Stephan Eisfelder, Seelze (DE); Mike Heurich, Apelern (DE); Reiner Hölscher, Seelze (DE); Tino Wiggers, Seelze (DE)

(73) Assignee: WABCO GmbH, Hannover (DE)

( * ) Notice: Subject to any disclaimer, the term of this patent is extended or adjusted under 35 U.S.C. 154(b) by 971 days.

(21) Appl. No.: 12/735,367

(22) PCT Filed: Oct. 23, 2008

(86) PCT No.: PCT/EP2008/008976
§ 371 (c)(1),
(2), (4) Date: Sep. 23, 2010

(87) PCT Pub. No.: WO2009/095045
PCT Pub. Date: Aug. 6, 2009

(65) Prior Publication Data
US 2011/0023702 A1 Feb. 3, 2011

(30) Foreign Application Priority Data
Jan. 29, 2008 (DE) .......................... 10 2008 006 384

(51) Int. Cl.
*F01B 7/20* (2006.01)
*F01B 7/00* (2006.01)

(52) U.S. Cl.
USPC .................................. 92/62; 92/52

(58) Field of Classification Search
USPC ................................. 92/52, 62, 128
See application file for complete search history.

(56) References Cited

U.S. PATENT DOCUMENTS 3,031,853 A   5/1962   Olson
5,749,264 A   5/1998   Broadbent

FOREIGN PATENT DOCUMENTS

EP   0 803 651 A1   10/1997
GB   1 061 175      3/1967

*Primary Examiner* — Michael Leslie
(74) *Attorney, Agent, or Firm* — Kramer Levin Naftalis & Frankel LLP

(57) ABSTRACT

A pneumatic cylinder includes a cylinder housing, a central piston displaceable longitudinally in the cylinder housing, a first trailing piston configured to work with a first trailing stop of the central piston and a first positioning stop on the cylinder housing, and a second trailing piston configured to work with a second trailing stop of the central piston and a second positioning stop on the cylinder housing. The cylinder housing comprises a base body in which the first trailing piston runs, a cylinder cover in which the second trailing piston runs, and an intermediate washer on which the first positioning stop and the second positioning stop are formed.

18 Claims, 4 Drawing Sheets

PNEUMATIC CYLINDER

FIELD OF THE INVENTION

The present invention generally relates to a pneumatic cylinder with a cylinder housing, with a central piston movable longitudinally in the cylinder housing, with a first trailing piston designed to cooperate with a first trailing stop of the central piston and a first positioning stop on the cylinder housing, and with a second trailing piston designed to cooperate with a second trailing stop of the central piston and a second positioning stop on the cylinder housing.

BACKGROUND OF THE INVENTION

Pneumatic cylinders of the general type under consideration are used, for example, in transmission actuators and are also known as 3-position cylinders. Such pneumatic cylinders possess a base body and two cylinder covers arranged on both sides of the base body. To produce known pneumatic cylinders, first, the central piston and the trailing pistons are fastened to the base body. Thereafter, cylinder covers are screwed to both sides of the base body and are in each case sealed off with respect to the base body by sealing means.

The disadvantage of conventional pneumatic cylinders is that they are complicated to produce. Thus, two cylinder covers have to be adjusted on the base body and provided in each case with a seal.

SUMMARY OF THE INVENTION

It is therefore an object of the present invention to provide a pneumatic cylinder that can be produced more simply and with higher process reliability. This is achievable in accordance with the present invention by means of embodiments of a pneumatic cylinder in which the cylinder housing comprises a base body in which the first trailing piston runs, a cylinder cover in which the second trailing piston runs, and an intermediate disc on which the first positioning stop and the second positioning stop are formed.

It will be appreciated that, with the inventive embodiments, production is simplified. For this purpose, first, the base body is produced. Subsequently, the central piston and the first and the second trailing piston are introduced into the base body. Then, the intermediate disc is laid onto the base body, and both are covered by the cylinder cover. The connection of the cylinder housing consequently takes place in one step, not in two steps, as in conventional pneumatic cylinders. Moreover, the pneumatic cylinder according to embodiments of the invention can be designed so that only one sealing element is required, thus leading to savings with respect to materials. A further advantage is that the cylinder housing of the pneumatic cylinder can, according to embodiments of the invention, consist of undercut-free components. These are, moreover, very simple to manufacture, and therefore the outlay in manufacturing terms falls. A further advantage is that the pneumatic cylinder according to embodiments of the invention can easily be demounted and mounted again in the event of a malfunction.

Within the scope of the present description, the intermediate disc may have a configuration that is disc-shaped in mathematical terms, but this does not have to be so. However, the height of the intermediate disc, that is its extent in the longitudinal direction of the central piston, is markedly smaller than its width, that is its extent perpendicularly with respect to the longitudinal direction of the central piston. For example, the height of the intermediate disc amounts to less than one quarter of its width, in particular, less than one eighth of its width.

In a preferred embodiment, the pneumatic cylinder comprises at least one connecting element that braces the cylinder cover against the intermediate disc and the intermediate disc against the base body. In other words, the connecting element clamps the intermediate disc between the base body and cylinder cover. For example, the connecting element can be a screw, by means of which the cylinder cover is braced against the base body. The intermediate disc arranged between the base body and the cylinder cover either is located radially between a plurality of connecting elements or is penetrated at least partially by these. The advantage of this is that mounting is especially simple and that, as compared with conventional pneumatic cylinders, the number of connecting elements can be reduced.

Preferably, the connecting element comprises a central sleeve fitted in each case into a central bore in the base body and in the cylinder cover. If appropriate, the central sleeve penetrates a bore in the intermediate disc or is fitted into this bore. By means of the central sleeve, the base body and cylinder cover can be adjusted accurately in relation to one another, thus enabling the central piston to roll with low wear, while at the same time providing for simple and rapid manufacture.

The cylinder cover is preferably sealed off with respect to the cylinder housing by means of a sealing element. In this case, there is contact between the sealing element and cylinder housing and at the same time between the sealing element and cylinder cover. Only a single sealing element is therefore necessary in order to seal off the cylinder cover with respect to the base body. This can be achieved, for example, in that the sealing element is arranged radially outside the intermediate disc with respect to a longitudinal axis of the central piston. This gives rise to an especially simple design that manages with only one sealing element. Alternatively, the intermediate disc is sealed off, for example, via two sealing elements that are in contact with the intermediate disc on both sides.

According to one embodiment, the intermediate disc possesses on both sides at least one sealing portion, in particular a vulcanized-on rubber sealing portion. That is, the intermediate disc possesses a first sealing portion, which seals off the intermediate disc with respect to the base body, and a second sealing portion, which seals off the intermediate disc with respect to the cylinder cover. The advantage of this is that, by the intermediate disc being introduced onto the base body and by the cylinder cover subsequently being mounted on the base body, centering of the base body and cylinder cover and sealing-off of all the components are achieved at the same time. This makes for simplified manufacture.

Centering of the intermediate disc in relation to the base body is especially simple if the intermediate disc is fitted, free of play, into a base body recess in the base body. A play-free fit of this type is especially simple to manufacture, since the intermediate disc and the base body recess are then circular structures that can be produced with very high accuracy by lathe turning.

Preferably, the intermediate disc engages, free of play, into a cylinder-cover recess in the cylinder cover, so that the cylinder cover is fixed, free of play, to the base body non-displaceably, perpendicularly about a longitudinal direction of the central piston. In other words, the intermediate disc is mounted, free of play, both on the base body and on the cylinder cover. This results in non-displaceability of the cylinder cover in relation to the base body in the radial direction. Especially simple manufacture is thus obtained. More particularly, the base body and cylinder cover can be produced merely by the intermediate disc being laid onto the base body and by the cylinder cover being laid onto the intermediate disc, if the intermediate disc has a convex radial margin. The intermediate disc, base body and cylinder cover are thereby self-centering. Any manufacturing tolerances lead merely to a displacement of the components in the longitudinal direction of the central piston. During subsequent bracing of the cylinder cover and base body, the intermediate disc is deformed elastically and the cylinder cover is aligned, as regards its reception bore for the central piston, with the reception bore of the base body for the central piston.

The first trailing-piston stop and the first positioning stop are preferably arranged essentially at one height with respect to a longitudinal axis of the central piston when the pneumatic cylinder is in a middle position. In other words, the first trailing-piston stop and the first positioning stop lie essentially adjacently radially in a middle position.

In the same way, the second trailing-piston stop and the second positioning stop are preferably arranged at one height with respect to the longitudinal axis of the central piston in the middle position. In the middle position, the first trailing-piston stop and the first positioning stop, on the one hand, and the second trailing-piston stop and the second positioning stop, on the other hand, consequently simultaneously lie adjacently radially. In other words, the distance between the first trailing-piston stop and the second trailing-piston stop is essentially the same as the distance between the first positioning stop and the second positioning stop.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

Exemplary embodiments of the invention are explained in more detail below by means of the accompanying drawings in which.

DETAILED DESCRIPTION OF THE PREFERRED EMBODIMENTS

Figure 1:
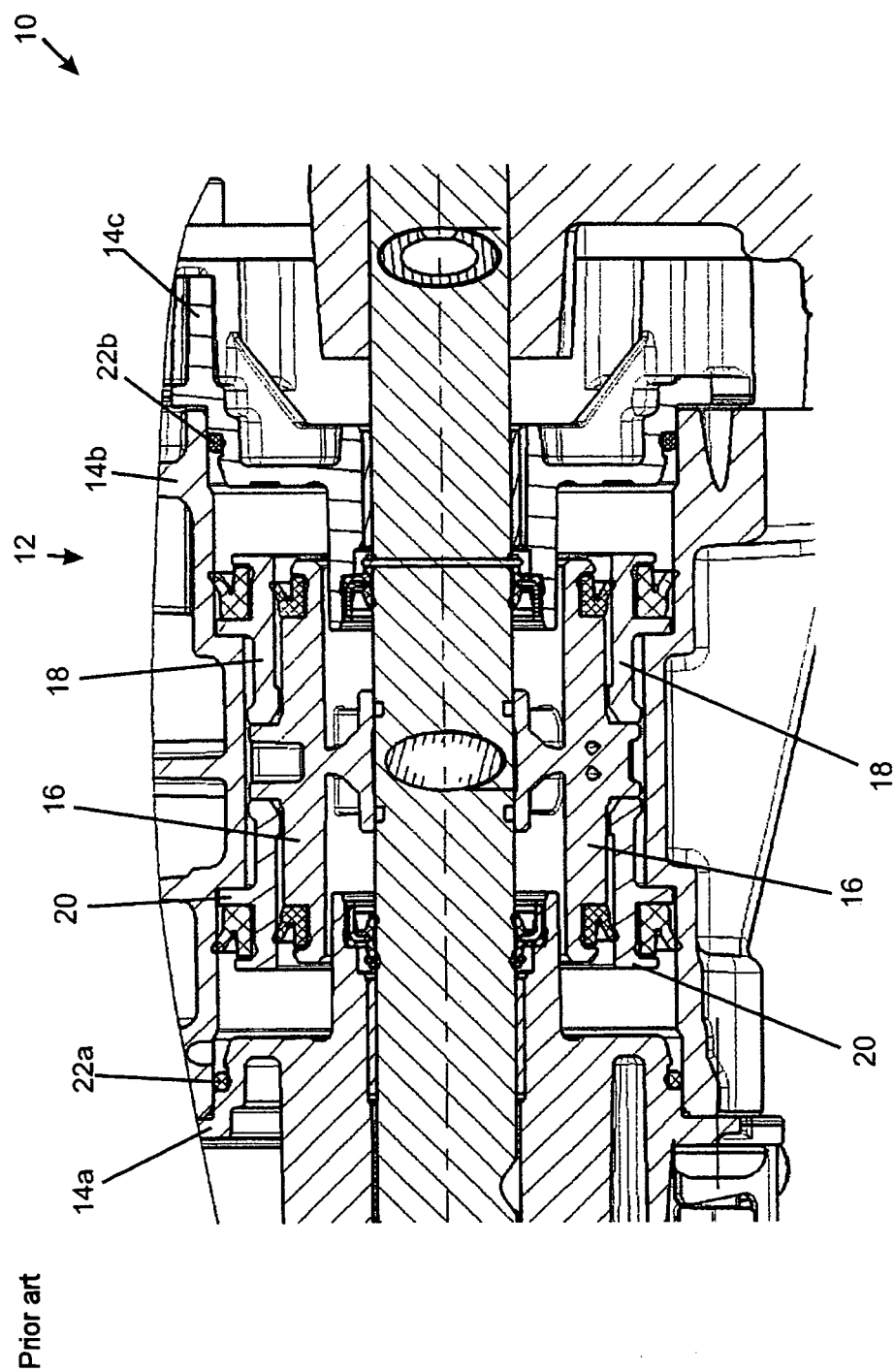
FIG. 1 shows a conventional (prior art) pneumatic cylinder.

Referring now to the drawing figures FIG. 1 shows a prior art pneumatic cylinder 10 having a cylinder housing 12 that comprises three cylinder-housing parts 14a, 14b, 14c. A central piston 16 runs in the cylinder housing 12. Moreover, the pneumatic cylinder 10 comprises a first trailing piston 18 and a second trailing piston 20. For assembly, the first cylinder-housing part 14a and the third cylinder-housing part 14c are mounted onto the central cylinder-housing part 14b and are sealed off with respect to one another by means of respective sealing elements 22a, 22b.

Figure 2:
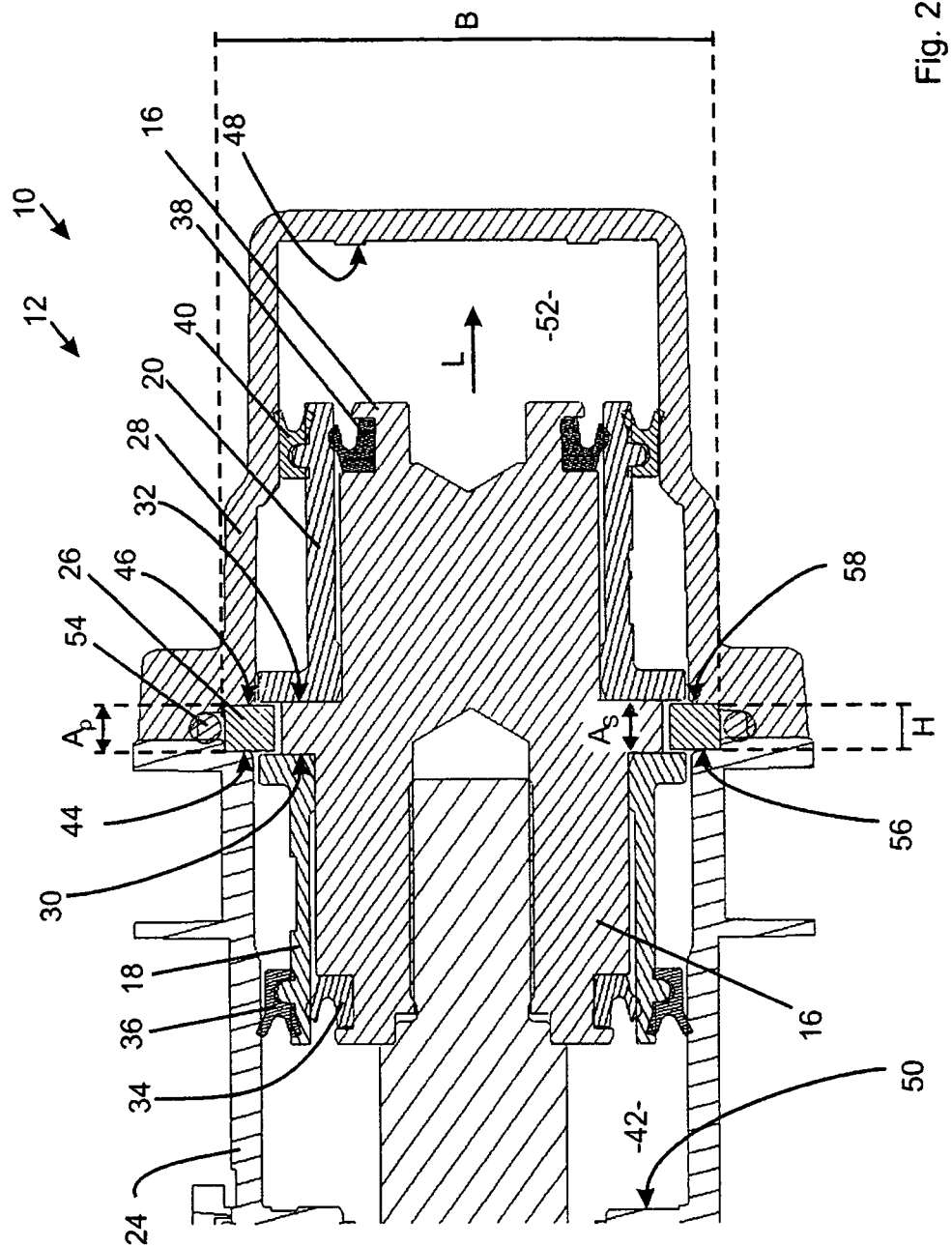
FIG. 2 shows a cross section through a pneumatic cylinder according to one embodiment of the present invention.

FIG. 2 shows a cross section through a pneumatic cylinder 10 according to an embodiment of the invention having a cylinder housing 12 constructed from a base body 24, from an intermediate disc 26 and from a cylinder cover 28. The central piston 16 possesses a first trailing stop 30, against which the first trailing piston 18 can butt. The central piston 16 also possesses a second trailing stop 32, against which the second trailing piston 20 can butt.

The first trailing piston 18 is sealed off with respect to the central piston 16 via a first seal 34 and with respect to the base body 24 by means of a second seal 36. Similarly, the second trailing piston 20 is sealed off with respect to the central piston 16 by means of a third seal 38 and with respect to the cylinder cover 28 by means of a fourth seal 40.

By compressed air being introduced into a base body cylinder 42, the first trailing piston 18 moves towards the cylinder cover 28 until it butts against a first positioning stop 44 of the intermediate disc 26. When the pneumatic cylinder 10 is in its middle position, the first trailing stop 30 and the first positioning stop 44 are arranged at one height with respect to a longitudinal axis L of the central piston 16. At the same time, the second trailing stop 32 and a second positioning stop 46 are arranged at one height with respect to the longitudinal axis L. This indicates that a distance $A_P$ between the first positioning stop 44 and the second positioning stop 46 is equal to a distance $A_S$ between the first trailing stop 30 and the second trailing stop 32. In the present context, stops are the faces against which abutment takes place. These may be specially treated, for example hardened, but this does not have to be so.

If compressed air is present only in the base body cylinder 42, this compressed air pushes the central piston 16 so far to the right in FIG. 2 that it butts against an inner end face 48 of the cylinder cover 28. In the same way, the central piston 16 is pushed as far as a second inner end face 50 if compressed air acts only upon a cover cylinder 52 in the cylinder cover 28. If the same pressure prevails in the cover cylinder 52 as in the base body cylinder 42, the central piston 16 assumes the middle position shown in FIG. 2.

The base body 24 and cylinder cover 28 are connected to one another via a connecting element, not depicted in FIG. 2, in the form of a screw and are sealed off with respect to one another via a sealing element 54 in the form of an O-ring.

The intermediate disc 26 is received, free of play, in a base body recess 56. In the cylinder cover 28, a cylinder-cover recess 58 is provided, in which the intermediate disc 26 is likewise received, free of play. Thus, the cylinder cover 28 and the base body 24 are connected to one another, free of play, perpendicularly and parallel to the longitudinal axis L.

Figure 3:
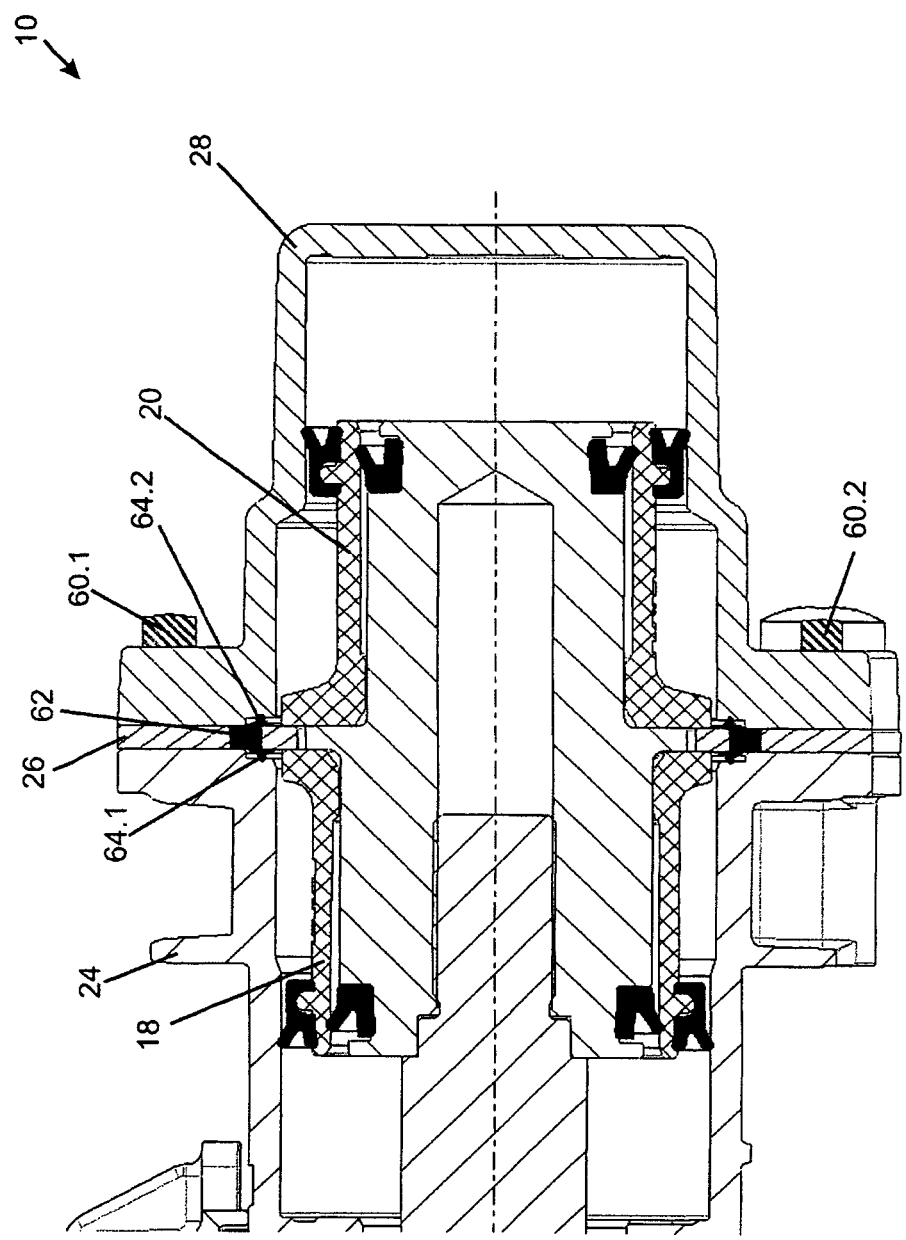
FIG. 3 shows a pneumatic cylinder according to another embodiment of the present invention.

FIG. 3 shows a second embodiment of a pneumatic cylinder 10 according to the invention, in which the base body 24 and cylinder cover 28 are connected to one another via connecting elements 60A, 60.2 in the form of machine screws. The intermediate disc 26 possesses a sealing element 62 in the form of two rubber sealing portions 64.1, 64.2 vulcanized on both sides.

Figure 4:
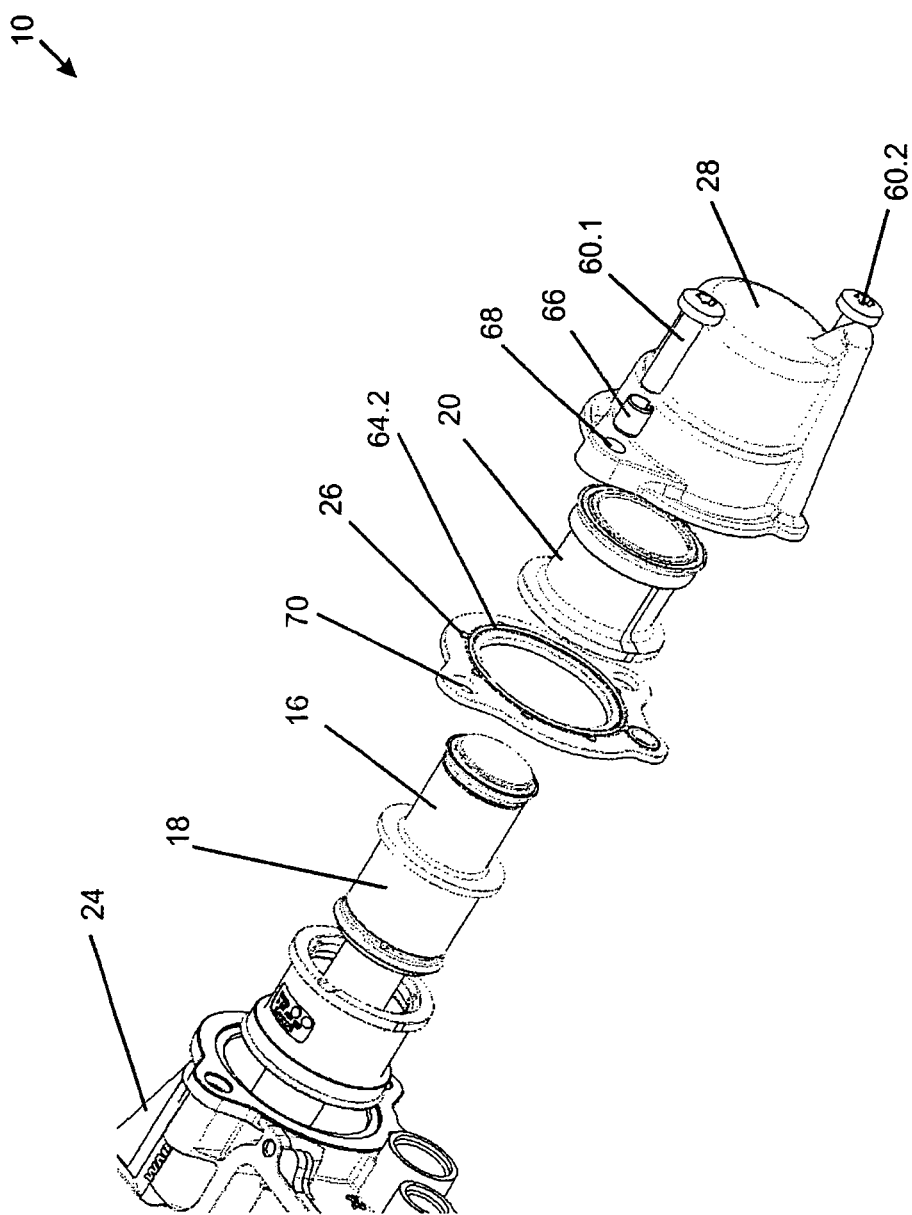
FIG. 4 shows an exploded view of a pneumatic cylinder according to an embodiment of the present invention.

FIG. 4 is an exploded drawing of the pneumatic cylinder 10, which may also be designated as a three-position cylinder, since, as described above, it can assume three firmly defined positions of the central piston 16 in relation to the base body 24. It can be seen that the connecting element 60.1 runs, via a central sleeve 66.1 fitted into a central bore, through a central bore 70 in the intermediate disc 26 and engages into a further central bore 72 on the base body 24. It is possible to prestress the pneumatic cylinder 10 by means of suitable spring assemblies so that it can be brought into four or more defined positions.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A pneumatic cylinder, comprising:
   a cylinder housing including a base body, a cylinder cover and an intermediate disc;
   a central piston movable longitudinally in the cylinder housing;
   a first trailing piston concentrically arranged about at least a portion of the central piston configured to cooperate with a first trailing stop of the central piston and a first positioning stop on the intermediate disc of the cylinder housing, the first trailing piston running in the base body of the cylinder housing; and
   a second trailing piston concentrically arranged about at least a portion of the central piston configured to cooperate with a second trailing stop of the central piston and a second positioning stop on the intermediate disc of the cylinder housing, the second trailing piston running in the cylinder cover of the cylinder housing.

2. The pneumatic cylinder according to claim 1, further comprising at least one connecting element configured to brace the cylinder cover against the intermediate disc and the intermediate disc against the base body.

3. The pneumatic cylinder according to claim 2, wherein the connecting element comprises at least one central sleeve fitted into a central bore in the base body and in the cylinder cover.

4. The pneumatic cylinder according to claim 1, further comprising a sealing element for sealing the cylinder cover with respect to the base body.

5. The pneumatic cylinder according to claim 1, wherein the intermediate disc includes at least one sealing portion.

6. The pneumatic cylinder according to claim 5, wherein the at least one sealing portion is a vulcanized-on rubber sealing portion.

7. The pneumatic cylinder according to claim 5, wherein the intermediate disc comprises a radial edge, a first face, and a second face.

8. The pneumatic cylinder according to claim 7, wherein the at least one sealing portion comprises a sealing element in contact with the radial edge.

9. The pneumatic cylinder according to claim 8, wherein the sealing element comprises a first sealing portion in contact with the first face and a second sealing portion in contact with the second face.

10. The pneumatic cylinder according to claim 7, wherein the at least one sealing portion comprises a first sealing element in contact with the first face and a second sealing element in contact with the second face.

11. The pneumatic cylinder according to claim 10, further comprising:
    a third sealing element sealing the first trailing piston with respect to the base body; and
    a fourth sealing element sealing the second trailing piston with respect to the cylinder cover.

12. The pneumatic cylinder according to claim 1, further comprising a base body recess defined in the base body, wherein the base body recess receives the intermediate disc free of play.

13. The pneumatic cylinder according to claim 12, further comprising a cylinder-cover recess defined in the cylinder cover, wherein the cylinder-cover recess receives the intermediate disc free of play, and wherein the cylinder cover is fixed free of play to the base body nondisplaceably, perpendicularly to a longitudinal direction of the central piston.

14. The pneumatic cylinder according to claim 1, wherein the intermediate disc has a convex radial margin.

15. A transmission actuator, comprising a pneumatic cylinder according to claim 1.

16. The pneumatic cylinder according to claim 1, further comprising:
    a first sealing element sealing the first trailing piston with respect to the central piston; and
    a second sealing element sealing the second trailing piston with respect to the central piston.

17. A method for producing a pneumatic cylinder, comprising the steps of:
    (a) producing a base body, a cylinder cover, a central piston, a first trailing piston, a second trailing piston, and an intermediate disc;
    (b) concentrically positioning the first trailing piston about at least a first portion of the central piston;
    (c) positioning the central piston and the first trailing piston within the base body;
    (d) positioning the intermediate disc onto one of the base body and the cylinder cover;
    (e) concentrically positioning the second trailing piston about at least a second portion of the central piston; and
    (f) connecting the intermediate disc to the base body and the cylinder cover.

18. The method according to claim 17, wherein the step of connecting the intermediate disc to the base body and the cylinder is effected in one step.

* * * * *